(12) United States Patent
Li et al.

(10) Patent No.: US 10,840,539 B2
(45) Date of Patent: Nov. 17, 2020

(54) LITHIUM BATTERIES, ANODES, AND METHODS OF ANODE FABRICATION (71) Applicant: KING ABDULLAH UNIVERSITY OF SCIENCE AND TECHNOLOGY, Thuwal (SA)

(72) Inventors: Lain-Jong Li, Thuwal (SA); Feng-Yu Wu, Thuwal (SA); Pushpendra Kumar, Thuwal (SA); Jun Ming, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 212 days.

(21) Appl. No.: 15/737,965

(22) PCT Filed: Jun. 21, 2016

(86) PCT No.: PCT/IB2016/000994
§ 371 (c)(1),
(2) Date: Dec. 19, 2017

(87) PCT Pub. No.: WO2016/207722
PCT Pub. Date: Dec. 29, 2016

(65) Prior Publication Data
US 2018/0301745 A1    Oct. 18, 2018

Related U.S. Application Data

(60) Provisional application No. 62/182,826, filed on Jun. 22, 2015.

(51) Int. Cl.
*H01M 10/0525* (2010.01)
*H01M 4/04* (2006.01)
(Continued)

(52) U.S. Cl.
CPC ..... *H01M 10/0525* (2013.01); *H01M 4/0423* (2013.01); *H01M 4/133* (2013.01);
(Continued)

(58) Field of Classification Search
CPC ............. H01M 10/049; H01M 10/052; H01M 10/0525; H01M 4/0423; H01M 4/133;
(Continued)

(56) References Cited

U.S. PATENT DOCUMENTS

| | | |
|---|---|---|
| 821,393 A | 5/1906 | Wright et al. |
| 4,482,615 A | 11/1984 | Rosansky et al. |

(Continued)

FOREIGN PATENT DOCUMENTS

| | | |
|---|---|---|
| CN | 1511351 A | 7/2004 |
| CN | 1595679 A | 3/2005 |

(Continued)

OTHER PUBLICATIONS

International Search Report and Written Opinion received in connection with International Application No. PCT/IB2016/000994; dated Sep. 14, 2016.

(Continued)

*Primary Examiner* — Adam A Arciero
(74) *Attorney, Agent, or Firm* — Patent Portfolio Builders PLLC (57) ABSTRACT

Prelithiation of a battery anode carried out using controlled lithium metal vapor deposition. Lithium metal can be avoided in the final battery. This prelithiated electrode is used as potential anode for Li-ion or high energy Li—S battery. The prelithiation of lithium metal onto or into the anode reduces hazardous risk, is cost effective, and improves the overall capacity. The battery containing such an anode exhibits remarkably high specific capacity and a long cycle life with excellent reversibility.

14 Claims, 8 Drawing Sheets

Substantially planar electrolyte facing surface

---

Optional third zone is present: lithium metal (without electrochemically active anode material)

---

Second zone: lithium metal and electrochemically active anode material

---

First zone: electrochemically active anode material (without lithium)

---

(51) Int. Cl.
  *H01M 4/134* (2010.01)
  *H01M 4/1393* (2010.01)
  *H01M 4/1395* (2010.01)
  *H01M 4/36* (2006.01)
  *H01M 4/38* (2006.01)
  *H01M 10/052* (2010.01)
  *H01M 4/133* (2010.01)
  *H01M 10/04* (2006.01)
  *H01M 4/587* (2010.01)
  *H01M 4/1397* (2010.01)

(52) U.S. Cl.
  CPC ......... *H01M 4/134* (2013.01); *H01M 4/1393* (2013.01); *H01M 4/1395* (2013.01); *H01M 4/366* (2013.01); *H01M 4/386* (2013.01); *H01M 4/387* (2013.01); *H01M 10/049* (2013.01); *H01M 10/052* (2013.01); *H01M 4/1397* (2013.01); *H01M 4/38* (2013.01); *H01M 4/587* (2013.01)

(58) Field of Classification Search
  CPC .. H01M 4/134; H01M 4/1393; H01M 4/1395; H01M 4/1397; H01M 4/366; H01M 4/38; H01M 4/386; H01M 4/387; H01M 4/587
  See application file for complete search history.

(56) References Cited

U.S. PATENT DOCUMENTS

| | | |
|---|---|---|
| 5,595,837 A | 1/1997 | Olsen et al. |
| 5,648,187 A | 7/1997 | Skotheim |
| 8,158,282 B2 | 4/2012 | Zhamu et al. |
| 2002/0012846 A1 | 1/2002 | Skotheim et al. |
| 2002/0182508 A1 | 12/2002 | Nimon et al. |
| 2003/0039890 A1 | 2/2003 | Yun et al. |
| 2003/0194604 A1 | 10/2003 | Aamodt et al. |
| 2004/0096745 A1 | 5/2004 | Shibano et al. |
| 2008/0057390 A1 | 3/2008 | Kondo et al. |
| 2008/0070099 A1 | 3/2008 | Barrella |
| 2008/0311477 A1* | 12/2008 | Salot ............ H01M 4/0423 429/231.95 |
| 2009/0068563 A1 | 3/2009 | Kanda et al. |
| 2009/0081554 A1 | 3/2009 | Takada et al. |
| 2009/0305135 A1 | 12/2009 | Shi et al. |
| 2010/0028775 A1 | 2/2010 | Emura et al. |
| 2011/0104571 A1 | 5/2011 | Zhamu et al. |
| 2011/0135810 A1 | 6/2011 | Yakovleva et al. |
| 2011/0162972 A1 | 7/2011 | Furuya et al. |
| 2011/0165462 A1 | 7/2011 | Zhamu et al. |
| 2011/0165466 A1 | 7/2011 | Zhamu et al. |
| 2011/0171537 A1 | 7/2011 | Takeuchi et al. |
| 2011/0308935 A1 | 12/2011 | Yamazaki et al. |
| 2012/0082901 A1 | 4/2012 | Schmidt et al. |
| 2012/0088154 A1 | 4/2012 | Liu et al. |
| 2012/0119158 A1 | 5/2012 | Barchasz et al. |
| 2012/0121983 A1 | 5/2012 | Yoon et al. |
| 2013/0045427 A1 | 2/2013 | Zhamu et al. |
| 2013/0149567 A1 | 6/2013 | Schaefer |
| 2013/0164635 A1 | 6/2013 | Schmidt et al. |
| 2013/0295464 A1 | 11/2013 | Yanagi et al. |
| 2014/0023926 A1 | 1/2014 | Li et al. |
| 2014/0037535 A1 | 2/2014 | Miyashita |
| 2014/0162139 A1 | 6/2014 | Hoshiba et al. |
| 2014/0315100 A1 | 10/2014 | Wang et al. |
| 2015/0002101 A1 | 1/2015 | Hasegawa et al. |

FOREIGN PATENT DOCUMENTS

| | | |
|---|---|---|
| CN | 101438453 A | 5/2009 |
| DE | 102013220785 A1 | 4/2015 |
| WO | WO 01/06578 A1 | 1/2001 |
| WO | WO 2007/111895 A2 | 10/2007 |
| WO | WO 2013/152897 A1 | 10/2013 |
| WO | WO 2016/022117 A1 | 2/2016 |

OTHER PUBLICATIONS

Crompton, "Battery Reference Book", 3$^{rd}$ ed. 2000, (Table of Contents).
Hayner et al., "Materials for Rechargeable Lithium-Ion Batteries", Annu. Rev. Chem. Biomol. Eng. 2012.3:445-471.
Li et al., "Developments of electrolyte systems for lithium-sulfur batteries: a review", Frontiers in Energy Research, Feb. 2015, vol. 3, Article 5, 1.
Nazri et al. (Eds.), Lithium Batteries: Science and Technology, 2003 (Table of Contents).
Park, Principles and Applications of Lithium Secondary Batteries, 2012 (Table of Contents).
Scrosati et al. (Eds.), Lithium Batteries: Advanced Technologies and Applications, 2013; summary.
Yoshio et al. (Eds.), Lithium-Ion Batteries, 2009; (Table of Contents and Introduction).
First Examination Report in corresponding/related GCC Application No. GC 2016-31549, dated Mar. 21, 2019 (Documents D1 and D2 were cited in the IDS filed Jan. 22, 2018).
First Office Action and Search Report in corresponding/related Chinese Application No. 201680048718.5, dated Jun. 11, 2020 (CN100530771C is equivalent to US2008311477A1 cited on PTO-892 dated Nov. 1, 2019 and US2013045427A1, DE102013220785A1 and US2003039890A1 were cited in the IDS filed Dec. 19, 2017).

* cited by examiner

Substantially planar electrolyte facing surface

---

Optional third zone is present: lithium metal (without electrochemically active anode material)

---

Second zone: lithium metal and electrochemically active anode material

---

First zone: electrochemically active anode material (without lithium)

Substantially planar electrolyte facing surface

Second zone: lithium metal and electrochemically active anode material (optional third zone is absent)

First zone: electrochemically active anode material (without lithium)

LITHIUM BATTERIES, ANODES, AND METHODS OF ANODE FABRICATION

CROSS REFERENCE TO RELATED APPLICATION

This is a national stage application of International Application No. PCT/IB2016/000994, filed internationally on Jun. 21, 2016, which claims priority to U.S. Provisional Application Ser. No. 62/182,826, filed on Jun. 22, 2015, both of which are incorporated by reference herein in their entireties.

BACKGROUND

Lithium batteries, including lithium ion and lithium metal batteries, are growing in commercial importance. Lithium ion batteries have certain advantages over lithium metal batteries (and vice versa). However, the energy density of lithium ion batteries needs to be improved for applications in (for example) consumer electronics, portable devices, the power grid, and electric vehicles. Although several anodes for lithium ion batteries including Si and Sn have shown more than 4 times higher capacity than conventional material, graphite (about 370 mAh/g), the power density of the full battery is still limited by the low capacity of cathode material which is typically in the range of 100-250 mAh $g^{-1}$. For example, the specific-capacities of lithium cobalt oxide, lithium manganese oxide, and lithium iron phosphate cathodes are only around 145, 120, 170 mAh/g.

Lithium metal batteries have certain advantages over lithium ion batteries, and a lead example of the lithium metal battery is the lithium sulfur battery. The lithium sulfur battery has been notable for its extremely high theoretical capacity 1,670 mAh/g. It is almost 10 times higher than the metal oxide based cathodes. However, for the reported Li—S battery, the S is used as the cathode and the lithium metal is used as the anode. The specific capacity of the Li—S battery is high but the use of lithium metal as the anode in the battery raises the safety concerns which need to be solved.

Another known issue for the Li—S battery is that the lithium dendrite could easily form on the surface of lithium anode which can further grow and even penetrate through the separator, leading to the short-circuit between cathode and anode.

In attempting to solve the safety issue of lithium batteries, a method was disclosed in U.S. Patent Publication 2011/0135810 for spreading stabilized lithium powder on certain substrates. Similarly, in WO 2001/006578, lithium thin film is laminated on the electrode for increasing battery capacity. However, the complicated processes involved with lithium powders and lithium lamination are still challenging for battery manufacture. These references do not describe use of vapor deposition methods to deposit lithium metal and do not describe controlled, limited amounts of lithium.

Also, in U.S. Patent Publication 2012/0121983, a method to directly deposit lithium on patterned silicon anode was demonstrated to effectively suppress the Li dendrites formation. However, the lithium metal is still present during the charge/discharge cycles. More particularly, 2012/0121983 describes use of a micropatterned Si anode which has lithium metal deposited only on the lower concave portions of the anode on a non-flat surface. It is not deposited on the walls or the upper convex portions of the anode. No sulfur cathode is described. Lithium is deposited by electroplating, not by vapor vacuum methods.

PCT application PCT/US2014/050043 filed Feb. 15, 2014 (WO 2016/022117A1) describes a cathode for a Li—S battery. However, this reference describes a conventional lithium anode.

U.S. Patent Publication 2012/0088154 describes a cathode for a Li—S battery. However, this reference describes a conventional lithium anode.

U.S. Patent Publication 2014/0023926 describes a composite electrode for a Li ion battery. However, this reference does not describe use of metallic lithium anodes, and does not describe use of vapor deposition methods to deposit lithium metal.

U.S. Patent Publication 2002/0012846 (Moltech) reference describes an anode for a lithium sulfur battery. In the anode, lithium metal is vapor deposited onto a substrate in preparation of an anode. However, the substrate is not "electrochemically active" but merely supporting and electronically conductive (as in a current collector); it is not for example Si, Sn, or graphite. The only use of tin is to possibly alloy with lithium. The only use of graphite is as a cathode material. Silicon is not mentioned. The amount of Li is not controlled. It is said lithium can be in excess. Also, one must deposit a multi-layer structure on top of the lithium layer. The cathode is sulfur.

U.S. Patent Publication 2011/0162972 (Sony) describes a method of making a positive-electrode active film (cathode) for a lithium ion battery. The cathode will include lithium, and lithium is introduced into the cathode by electroplating. The anode are conventional anodes for lithium ion batteries.

U.S. Pat. No. 8,158,282 describes pre-lithiated anodes. However, the amount of lithium is relatively large, sufficiently large to allow one to commutate the material into particles. In '282, the purpose of making a prelithiated material is to convert the material to particle form.

U.S. Pat. No. 5,595,837 also describes prelithiation processes but does not describe vapor deposition of lithium.

U.S. Patent Publication 2009/0305135 (Nanotek Instruments) describes an electrode, anode or cathode, based on electrically conductive nanofilaments which have electroactive particles bonded to the surfaces with a conductive binder. However, there is no particular focus on Li—S batteries.

U.S. Patent Publication 2011/0104571 (Nanotek Instruments) describes lithium particles on the nanofilament grid but no vapor deposition of lithium.

U.S. Patent Publication 2011/0165466 (Nanotek Instruments) describes a nano-structured cathode for use with a lithium metal or lithium ion battery focusing on sulfur cathode. However, vapor deposition of lithium is not described.

U.S. Patent Publication 2011/0165462 (Nanotek Instruments) describes an anode for lithium batteries. Some focus on the Li—S system. Vapor deposition of lithium is not described.

U.S. Patent Publication 2014/0315100 (Nanotek Instruments) describes a cathode for lithium batteries. Vapor deposition of lithium is not described.

U.S. Patent Publication 2008/0057390 (Seiko) describes a lithium battery in which the anode can be lithium metal or a Li alloy and it can be vapor deposited; all solid battery; confusing if lithium ion or lithium metal or BOTH. Not a Li—S battery. No sulfur cathode is described.

U.S. Patent Publication 2004/0096745 (Matsushita) describes an ionic conductor of Li, Ta, and N. However, it does not describe vapor deposition of Li anode.

U.S. Patent Publication 2002/0182508 (PolyPlus Battery Co.) describes a lithium sulfur battery in which a lithium anode is used as substrate and metals deposited on it to form alloy. However, it does not describe vapor deposition of Li anode.

U.S. Patent Publication 2010/0028775 (Sumitomo Electric) describes a variety of different types of batteries, including Li—S, based on an insulating layer structure. For a lithium anode, it can be vapor deposited. However, the insulating structure is required. The amount of the lithium is not controlled.

U.S. Patent Publication 2011/0308935 (SEL) describes use of chemical vapor deposition to make the positive electrode in a lithium ion battery. The anode such as lithium can be prepared by evaporation. However, the amount of lithium is not limited. A Li—S battery is not described.

Despite these advances, a need exists to find better lithium battery structures and methods including better safety performance.

SUMMARY

Embodiments described herein include devices, articles, and systems, as well as methods of forming and methods of using such devices, articles, and systems.

A first aspect is a method for preparing an anode for a lithium battery comprising: providing at least one anode precursor comprising at least one electrochemically active anode material but which is substantially free of lithium; the anode precursor comprising at least one substantially planar surface; depositing lithium through vapor deposition on the substantially planar surface of the anode precursor, wherein at least some of the deposited lithium and the electrochemically active anode material at the surface form a second zone on top of a first zone, wherein the second zone comprises a mixture of the lithium and electrochemically active anode material, and the first zone comprises the electrochemically active anode material but does not contain lithium, optionally, at least some of the deposited lithium forms a third zone which is a surface layer of lithium which is substantially free of the electrochemically active anode material and disposed on the second zone, wherein the optional third zone if present has a thickness of about 500 nm or less.

A second aspect is a method for preparing an anode for a lithium battery comprising: providing at least one anode precursor comprising at least one electrochemically active anode material but which is substantially free of lithium; the anode precursor comprising at least one substantially planar surface; depositing lithium through vapor deposition on the substantially planar surface of the anode precursor, wherein at least some of the deposited lithium and the electrochemically active anode material at the surface form a second zone on top of a first zone, wherein the second zone comprises a mixture of the lithium and electrochemically active anode material, and the first zone comprises the electrochemically active anode material but does not contain lithium, optionally, at least some of the deposited lithium forms a third zone which is a surface layer of lithium which is substantially free of the electrochemically active anode material and disposed on the second zone, wherein the total amount of the lithium deposited in the second zone and optional third zone is controlled to be within a range of ratios between the "weight of electrochemically active anode material" to the "weight of lithium" of 19:1 to 8:1.

In one embodiment, the optional third zone is absent. In another embodiment, the optional third zone is present. In one embodiment, the optional third zone if present has a thickness of about 100 nm or less. In one embodiment, the optional third zone if present has a thickness of 10 nm or less. In one embodiment, the total amount of the lithium deposited in the second zone and optional third zone is controlled to be within a range of ratios between the "weight of electrochemically active anode material" to the "weight of lithium" of 19:1 to 8:1. In one embodiment, at least 50% of the lithium is in the second zone. In one embodiment, at least 90% of the lithium is in the second zone. In one embodiment, the electrochemically active anode material is graphite, Si, or Sn. In one embodiment, the electrochemically active anode material is graphite, and the third zone is present. In another embodiment, the electrochemically active anode material is Si or Sn, and third zone is absent.

A third aspect is an anode for a lithium battery comprising: a first zone of the electrochemically active anode material but substantially free of lithium; and a second zone comprising a mixture of lithium and the electrochemically active anode material disposed on top of a first zone of the electrochemically active anode material, and optionally, a third zone of lithium layer which is substantially free of the electrochemically active anode material, wherein the optional third zone if present has a thickness of 500 nm or less.

In one embodiment, the optional third zone is absent. In another embodiment, the optional third zone is present. In one embodiment, the total amount of the lithium in the second zone and optional third zone is controlled to be within a range of ratios between the "weight of electrochemically active anode material" to the "weight of lithium" of 19:1 to 8:1. In one embodiment, the optional third zone if present has a thickness of 100 nm or less. In one embodiment, at least 50% of the lithium is in the second zone. In one embodiment, at least 90% of the lithium is in the second zone. In one embodiment, the electrochemically active anode material is graphite, Si, or Sn. In one embodiment, the electrochemically active anode material is graphite, and the third zone is present. In another embodiment, the electrochemically active anode material is Si or Sn, and third zone is absent. In one embodiment, the anode is supported on a current collector. In other embodiments, the anode is prepared by the methods described herein.

A fourth aspect is a battery comprising: at least one anode, the anode having a substantially planar electrolyte facing surface and at least two anode materials, one of which is lithium and the other of which is an electrochemically active anode material other than lithium; at least one cathode, the cathode having a substantially planar electrolyte facing surface; at least one electrolyte disposed between the anode's electrolyte facing surface and the cathode's electrolyte facing surface; wherein the anode comprises a first zone which is an inner electrochemically active substrate zone which comprises a first electrochemically active anode material but which is substantially free of lithium; wherein the anode also comprises a second zone disposed on the first zone which is a surface zone toward the electrolyte facing surface comprising a mixture of both lithium and the first electrochemically active anode material; wherein, optionally, the anode also comprises a third zone disposed on the second zone which is a lithium metal zone toward the electrolyte facing surface which is substantially free of the first electrochemically active anode material; wherein the optional third zone if present has a thickness of 500 nm or less.

In one embodiment, the cathode comprises sulfur or sulfide. In another embodiment, the cathode comprises sulfur.

In one embodiment, the optional third zone is absent, and in another embodiment, the optional third zone is present.

In one embodiment, the optional third zone if present has a thickness of 100 nm or less. In one embodiment, the total amount of the lithium in the second zone and optional third zone is controlled to be within a range of ratios between the "weight of electrochemically active anode material" to the "weight of lithium" of 19:1 to 8:1. In one embodiment, at least 50% of the lithium is in the second zone. In one embodiment, at least 90% of the lithium is in the second zone. In some embodiments, the cathode comprises sulfur, and the ratio of lithium to sulfur is 2:1 or less, or 1:1 or less.

In one embodiment, the electrochemically active anode material is graphite, Si, or Sn. In one embodiment, the electrochemically active anode material is graphite, and the third zone is present. In another embodiment, the electrochemically active anode material is Si or Sn, and third zone is absent. In one embodiment, the electrochemically active anode material is graphite and the cathode is a sulfur cathode. In one embodiment, the battery is in a discharged state, a partially charged state, or a charged state. In one embodiment, the battery is a secondary battery. In one embodiment, the anode is an anode according to the descriptions provided herein. In other embodiments, the anode is prepared by the methods described herein.

One or more advantages which can arise from at least one embodiment include, for example: reduction of hazardous risk with improved safety; cost effectiveness; higher battery capacity including specific capacity; long cycle life; excellent reversibility; ability to use commercial anodes; compatibility for a flexible battery; and/or free lithium metal is minimized or absent in the structure.

DETAILED DESCRIPTION

Introduction

Priority U.S. provisional application 62/182,826 filed Jun. 22, 2015 is hereby incorporated by reference in its entirety.

Lithium metal and lithium ion batteries ("lithium batteries") are generally known in the art. See, for example, Hayner et al., *Annu. Rev. Chem. Biomol. Eng.* 2012. 3:445-471; M. Yoshio, R. J. Brodd, and A. Kozawa (Eds.), *Lithium-Ion Batteries,* 2009; G.-A. Nazri and G. Pistola (Eds.), *Lithium Batteries: Science and Technology,* 2003; B. Scrosati, K. M. Abraham, W. A. van Schalkwjk, and J. Hassoun (Eds.), *Lithium Batteries: Advanced Technologies and Applications,* 2013; J.-K. Park, *Principles and Applications of Lithium Secondary Batteries,* 2012. These and other references describe, for example, electrochemical fundamentals, anodes, cathodes, electrolytes, systems, material property analysis, electrochemical analysis, battery design, battery manufacturing, battery performance evaluation, and applications for different kinds of lithium batteries including both lithium ion and lithium metal batteries.

Embodiments described herein include use of the transitions "comprising," "consisting essentially of," and "consisting of."

References cited herein are incorporated herein by reference.

Methods of Making the Anode

The anode can be made by several different but related methods.

In a first aspect, for example, a method is provided for preparing an anode for a lithium battery comprising: providing at least one anode precursor comprising at least one electrochemically active anode material but which is substantially free of lithium; the anode precursor comprising at least one substantially planar surface; depositing lithium through vapor deposition on the substantially planar surface of the anode precursor, wherein at least some of the deposited lithium and the electrochemically active anode material at the surface form a second zone on top of a first zone, wherein the second zone comprises a mixture of the lithium and electrochemically active anode material, and the first zone comprises the electrochemically active anode material but does not contain lithium, optionally, at least some of the deposited lithium forms a third zone which is a surface layer of lithium which is substantially free of the electrochemically active anode material and disposed on the second zone, wherein the optional third zone if present has a thickness of 500 nm or less.

Alternatively, a second aspect is a method for preparing an anode for a lithium battery comprising: providing at least one anode precursor comprising at least one electrochemically active anode material but which is substantially free of lithium; the anode precursor comprising at least one substantially planar surface; depositing lithium through vapor deposition on the substantially planar surface of the anode precursor, wherein at least some of the deposited lithium and the electrochemically active anode material at the surface form a second zone on top of a first zone, wherein the second zone comprises a mixture of the lithium and electrochemically active anode material, and the first zone comprises the electrochemically active anode material but does not contain lithium, optionally, at least some of the deposited lithium forms a third zone which is a surface layer of lithium which is substantially free of the electrochemically active anode material and disposed on the second zone, wherein the total amount of the lithium deposited in the second zone and optional third zone is controlled to be within a range of ratios between the "weight of electrochemically active anode material" to the "weight of lithium" of 19:1 to 8:1.

Other methods described herein can be used to make the anode.

Optional Third Zone and the Amount of Lithium

In one embodiment, the optional third zone is absent. In other words, the thickness of any lithium present on the surface is effectively zero within experimental limits of detection. For some electrochemically active anode materials, the lithium can react totally or substantially with the material (whether by reaction, insertation, and/or intercalation) so that no layer of lithium alone is formed as a third zone. Examples of these electrochemically active anode materials include silicon or tin. However, for other electrochemically active materials, the third zone can form, and examples include the carbon family of materials including graphite or graphene.

In another embodiment, the optional third zone is present. For example, the optional third zone, if present, can have a thickness of about 500 nm or less, about 250 nm or less, about 100 nm or less, or about 80 nm or less, or about 60 nm or less, or about 50 nm or less, or about 40 nm or less, or about 30 nm or less, or about 20 nm or less, or about 10 nm or less, or 5 nm or less, or 1 nm or less. There is no particular lower limit to this thickness, but the lower limit can be, for example, at least 1 nm, or at least 5 nm depending on the embodiment.

In addition, the total amount of the lithium deposited in the second zone and optional third zone can be controlled to be within a range of ratios between the "weight of electrochemically active anode material" to the "weight of lithium" of 19:1 to 8:1, or a range of 15:1 to 8:1, or a range of 12:1 to 8:1. It can be about 10:1.

In one embodiment, at least 50%, or at least 60%, or at least 70%, or at least 80%, or at least 90%, or at least 95%, or at least 98%, or at least 99% of the lithium is in the second zone. This percentage can be by weight or by mole percent. For example, for a carbon electrochemically active anode material, the percentage might be lower so that the range of at least 50% is applicable. However, for a silicon or tin electrochemically active anode material, the percentage might be lower so that the range of at least 90%, or 95%, or 98%, or 99% is applicable. The percentage of lithium in the second zone can depend on the nature and properties of the electrochemically active anode.

The surface layer of lithium (the third zone, which when present is disposed on the second zone) can be substantially or totally free of the electrochemically active anode material. Substantially free can mean, for example, less than 1 wt. %, or less than 0.1 wt. %, or less than 0.01 wt. %.

Anode Material

Anode materials for lithium batteries, including lithium ion batteries and lithium metal batteries, are generally known. The term "electrochemically active anode material" can be broadly understood to mean more than a material being oxidized or reduced. For example, the material can be a material which allows for intercalation, or insertion, of lithium. Or it can be an insertion alloy, a redox metal oxide, or a carbon allotrope. Carbonaceous materials can be used. Metal alloys and intermetallics can be used. Examples of alloys include $Li_xM$, where M is Al, Sn, Si, Sb, or Pb. In one embodiment, the electrochemically active anode material can comprise graphite, graphene, carbon nanotubes (including single wall carbon nanotubes), Si, Ge, Sn, an alloy, or a metal oxide. The metal oxide can be a titanate. It can also be, for example, $MnO_2$, $NiO$, $Co_3O_4$, $Fe_3O_4$, $Fe_2O_3$, $TiO_2$, and the like. In another embodiment, it is graphite. In another embodiment, it can be, for example, graphitic hard carbon or carbon nitride ($g-C_3N_4$).

The Anode

In addition to the method of making an anode, a third aspect provided herein is an anode for a lithium battery comprising: a first zone of the electrochemically active anode material but substantially free of lithium; and a second zone comprising a mixture of lithium and the electrochemically active anode material disposed on top of a first zone of the electrochemically active anode material, and optionally, a third zone of lithium layer which is substantially free of the electrochemically active anode material, wherein the optional third zone if present has a thickness of 500 nm or less.

Figure 2:
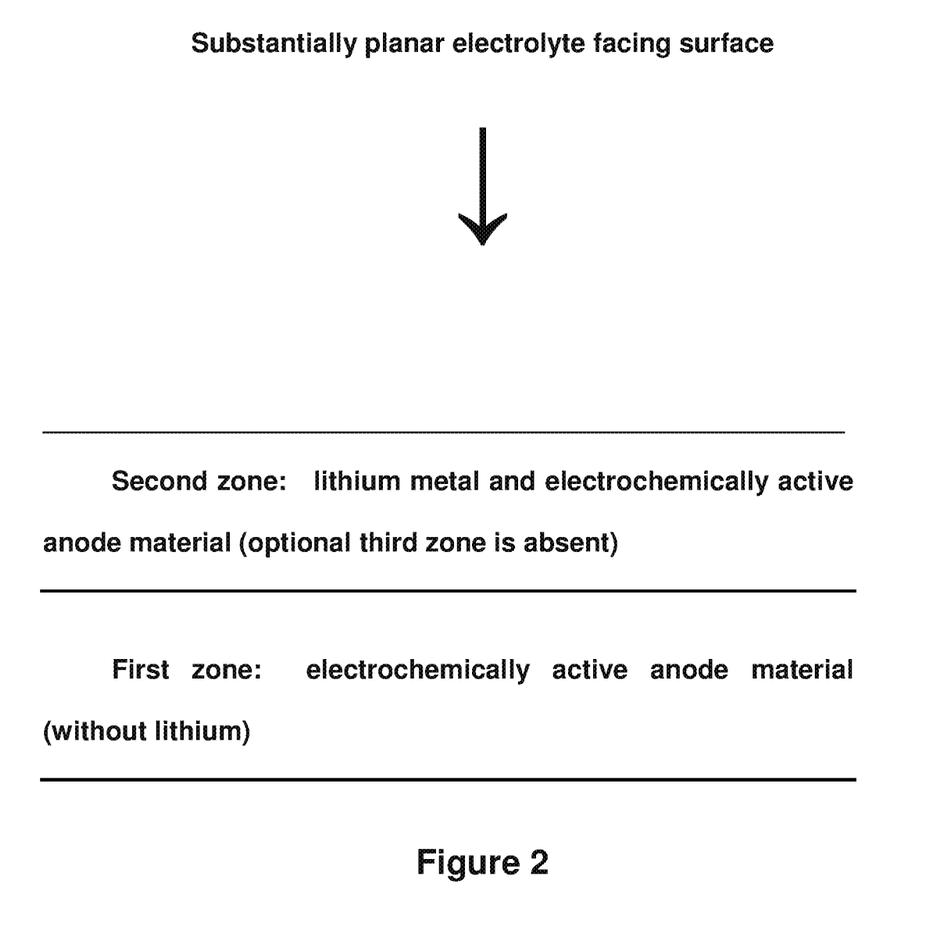
FIG. 2 illustrates an embodiment showing in cross-section the anode structure with two zones present, wherein the optional third zone of FIG. 1 is not present (in contrast to FIG. 1). The interfacial regions are idealized.

As described above in the method of making the anode, in one embodiment of the anode, the optional third zone is absent. For example, when the anode is silicon or tin, the third zone generally is absent as the anode material such as silicon or tin can intercalate and/or react with the lithium. FIG. 2 illustrates an idealized example of this embodiment (which can be called "prelithiation").

Figure 1:
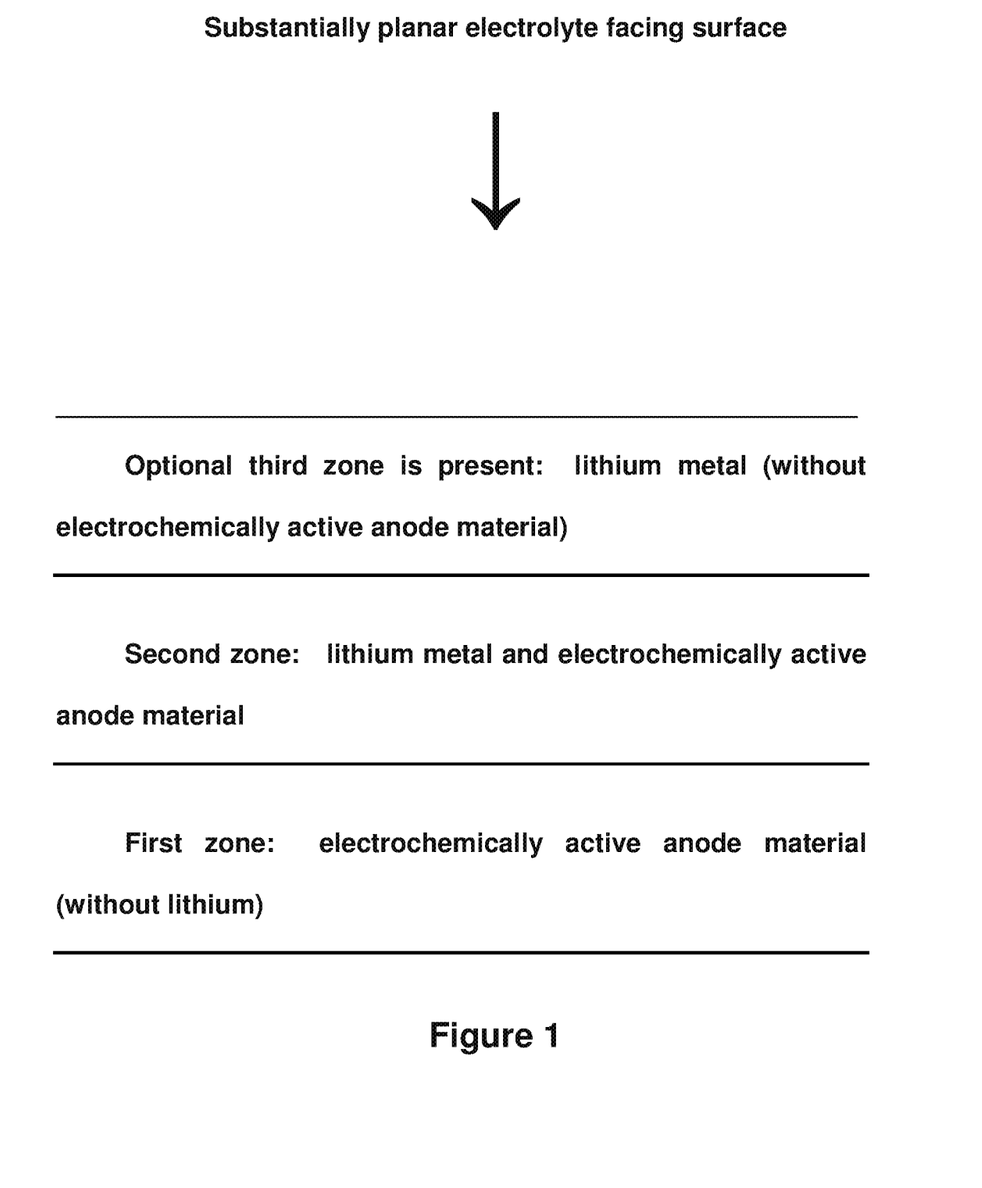
FIG. 1 illustrates an idealized embodiment showing in cross-section the anode structure (e.g., graphite) with three zones illustrated, although the third zone is optional. The interfacial regions are idealized.

In another embodiment of the anode, the optional third zone is present even if present in very small, thin amounts. For example, when the anode is carbon, the third zone is generally present, at least initially. FIG. 1 illustrates an example of this embodiment. In this case, one or more discharge/charge cycles can be carried out which can drive the lithium into the electrodes. Hence, the battery would have essentially no free lithium metal in the structure.

In another embodiment of the anode, the total amount of the lithium in the second zone and optional third zone is controlled to be within a range of ratios between the "weight of electrochemically active anode material" to the "weight of lithium" of 19:1 to 8:1. In another embodiment of the anode, the total amount of the lithium deposited in the second zone and optional third zone is controlled to be within a range of ratios between the "weight of electrochemically active anode material" to the "weight of lithium" of 12:1 to 8:1

In another embodiment of the anode, at least 50% of the lithium is in the second zone. In another embodiment of the anode, at least 70% of the lithium is in the second zone. In another embodiment of the anode, at least 90% of the lithium is in the second zone.

In another embodiment of the anode, the electrochemically active anode material is graphite, Si, or Sn.

Binders and conductive agents known in the art can be used for the anode.

In another embodiment of the anode, the anode is supported on a current collector. Examples of current collectors include flexible materials and metals, including for example, Cu, Al, ITO (indium tin oxide), Ti, and the like.

In another embodiment of the anode, the anode is prepared by the methods described herein. The descriptions above for the method of making the anode can be also applied to the anode itself.

The Battery

In addition to the method of making the anode and to the anode itself, also described herein are the batteries. Methods known in the art, and methods described herein, can be used to assemble batteries.

In a fourth aspect, provided is a battery comprising: at least one anode, the anode having a substantially planar electrolyte facing surface and at least two anode materials, one of which is lithium and the other of which is an electrochemically active anode material other than lithium; at least one cathode, the cathode having a substantially planar electrolyte facing surface; at least one electrolyte disposed between the anode's electrolyte facing surface and the cathode's electrolyte facing surface; wherein the anode comprises a first zone which is an inner electrochemically active substrate zone which comprises a first electrochemically active anode material but which is substantially free of lithium; wherein the anode also comprises a second zone disposed on the first zone which is a surface zone toward the electrolyte facing surface comprising a mixture of both lithium and the first electrochemically active anode material; wherein, optionally, the anode also comprises a third zone disposed on the second zone which is a lithium metal zone toward the electrolyte facing surface which is substantially free of the first electrochemically active anode material; wherein the optional third zone if present has a thickness of 500 nm or less.

In one embodiment, the optional third zone is absent. In one embodiment, the optional third zone is present. In one embodiment, the optional third zone if present has a thickness of 100 nm or less, or 10 nm or less.

In one embodiment, the total amount of the lithium in the second zone and optional third zone is controlled to be within a range of ratios between the "weight of electrochemically active anode material" to the "weight of lithium" of 19:1 to 8:1.

As described above, in one embodiment, at least 50% of the lithium is in the second zone. In another embodiment, at least 70% of the lithium is in the second zone. In another embodiment, at least 90% of the lithium is in the second zone.

The descriptions provided herein for the method of making the anode and the anode can also be applied to the battery and the methods of making the batteries.

Cathode of Battery

Cathodes for lithium batteries including lithium ion and lithium metal batteries are generally known. Inorganic materials can be used which function as a host for lithium ion; materials which allow for reversible insertion of lithium ion can be used. Examples include oxides and sulfides such as, for example, $TiS_2$, $V_2O_5$, and $MnO_2$. In one embodiment, the cathode comprises sulfur and/or sulfide. In another embodiment, the cathode comprises sulfur. As known in the art, the composition of the cathode will change throughout discharge and charge and through the lifetime of the battery. Sulfur cathodes are known in the art including use in a Li—S battery. In the Li—S battery, the $S_8$ can react during discharge with lithium to form Li—S compounds having a maximum ratio of 2-1 at full reaction ($LiS_2$). Intermediate salts or compounds include, for example, $Li_2S_8$, $Li_2S_6$, $Li_2S_4$, and $Li_2S_3$. During charging, the reverse sequence can occur.

As known in the art, because sulfur lacks electroconductivity, a conductor can be used such as a carbon conductor including a carbon coating or carbon nanofibers. The cathode can be, for example, a sulfur-porous carbon composite material, or a sulfur-graphene composite material, or a binder-free sulfur-carbon composite material, or a sulfur-polymer composite material, or a sulfur-metal oxide/chalcogenide composite material, as known in the art.

Binders and conductive agents known in the art can be used for the cathode. In some cases, binders can be avoided and not used.

The cathode and anode are, of course, designed to function together. For example, for a Li—S battery, the amount of lithium in the anode can be controlled in relation to the amount of sulfur in the cathode. For example, the ratio of two moles of lithium to one mole of sulfur can be used as a benchmark or limit. The lithium metal can be fully consumed by the cathode. For example, if 10 mg of sulfur is used, the required amount of lithium for the 2:1 molar ratio of $Li_2S$ is 4.3 mg Li. Hence, the amount of lithium and sulfur can be controlled so that the ratio of lithium and sulfur is less than 2:1. If one wants to only discharge the battery to a 1:1 ratio of lithium to sulfur, one only needs 2.15 mg lithium in this example. Hence, the ratio of lithium to sulfur can be, for example, 1.5:1 or less, or 1.0:1 or less, or 0.5:1 or less. One can determine the amount of lithium that provides sufficient functionality (e.g., battery capacity) but not too much lithium (e.g., to create a safety problem).

In another embodiment of the battery, the electrochemically active anode material is graphite and the cathode is a sulfur cathode.

A method of preparing a high performance half-cell battery with sulfur cathode and Li metal as anode is described in PCT/US2014/050043 (WO 2016/022117A1). This method includes simple physical mixture of graphene sheets and S particles in NMP/DMF followed by ultrasonication and spraying directly to current collector at low temperature. The advantage of thus formed graphene-S composite by spraying method could also serve for electrodes in versatile applications, such as printed electronics (i.e., touch-panel, flexible electronics, solar cell, organic light-emitters, and the like).

Electrolyte of Battery

Electrolytes for lithium batteries are generally known including at least one organic solvent and at least one salt. Mixtures of solvents and salts can be used. Single solvents or binary solvent mixtures can be used. The amount of each component can be adapted for the particular application. The salt concentration can be, for example, 0.1 M to 3 M, or about 1 M, for example. The electrolyte can be ionically conductive while electrically insulating. They can be liquid, gel, or solid electrolytes. They can be polymer electrolytes. Glass or ceramic electrolytes can be used. A porous, mechanical separator can be used.

Polar organic solvents can be used. Aprotic solvent can be used. Water can be minimized or excluded; solvents can be dried. Solvents can be, for example, ether-based, carbonate-based, or ionic liquid-based solvents. Ether solvents include linear or cyclic ethers. They can be, for example, chain-ethers such as dimethoxyethane (DME), polyethylene glycol dimethyl ethers (PEGDME), and tetraethylene glycol dimethyl ether (TEGDME). Other examples include 1,3-dioxolane, 2-ethoxyethyl eter, triglyme, diethylene glycol dimethyl ether (DEGDME), and tetrahydrofuran (THE). Other examples of organic solvent include ethylene carbonate, dimethyl carbonate, and diethyl carbonate.

The salts can be one or more lithium salts. Examples of lithium salts include, for example, $LiPF_6$, $LiBF_4$, $LiClO_4$, $LiNO_3$, LiSCN, LiTf, LiFSI, LiTFSI, LiBETI, $LiB(CN)_4$, LiBOB (lithium bis(oxalate)borate), LiDCTA, and LiTDI.

The electrolyte can be selected for particular use with the cathode such as sulfur cathode. See, for example, Li et al., *Frontiers in Energy Research*, February 2015, 3, 5, 1. For example, the electrolyte might help to prevent dissolution of polysulfides or minimize flammability as known in the art.

Additives can be used as needed in appropriate amounts. The function of the additive can be, for example, as a salt stabilizer, overcharge protector, and flame retardant. Examples include $LiNO_3$, polysulfides, and phosphorous pentasulfide. Additives of particular use for the Li—S battery can be used.

Other Battery Aspects

In one embodiment of the battery, the battery is in a discharged state, a partially charged state, or a charged state.

In one embodiment of the battery, the battery is a primary battery or a secondary battery. However, secondary batteries are preferred.

As known in the art, batteries can be used with a power management chip to help control discharge including the extent of discharge.

Some embodiments include devices and articles which comprise two or more batteries as described and claimed herein.

Methods known in the art can be used to assemble the battery. Semi-continuous methods, continuous methods and methods acceptable for scale-up can be used. Methods known in the art can be used to test battery performance and lifetime.

Applications

No particular limit is present on the applications as lithium batteries are widely used. The size of the battery and the number of the batteries can be controlled for the application, of course. Leading examples include cars, electric vehicles (EV), hybrid electric vehicles (HEV), consumer electronic devices, stationary applications, computers, space, medical, and the like.

More Preferred Embodiments

In the claimed inventions, S can be used as the active material in cathode, and commercial anode can be used instead of lithium metal as the anode. Evaporation technology can be introduced to deposit a desired quantity and uniform layer of lithium metal on the anode (e.g., commercial graphite, Si, or Sn-based composite etc.). In a Li—S battery, the amount of lithium evaporated on anode can be precisely controlled to match the amount of sulfur added.

The subsequent activation cycle (discharge and charge) can ensure the consumption of lithium into electrodes and no Li metal remains. Since there is no Li metal present in the full battery, the strategy can effectively suppress the formation of lithium dendrites, improve the safety, and reduce the cost of battery toward commercialization.

In preferred processes:
(1) The commercially available anode material graphitic powders (or Si or Sn based materials) are well-mixed with some conducting agents, such as Super P or KS6, and certain amount of binder with the help of ball milling using different sizes of grinding beads to get homogeneous slurry.
(2) Well mixed slurry can be coated over desired current collector/flexible electrode/Cu foil with the help of applicator while keeping current collector/flexible electrode/Cu foil at a certain temperature to dry.
(3) After drying/baking, the coated anode can be taken to vacuum chamber for controlled deposition of Li metal with the help of thermal evaporation of Li at certain temperature for a certain period of time.
(4) After thermally depositing Li metal on the anode, part of deposited lithium can diffuse into the layer of anode forming a pre-lithiated layer and the other part may still be present on the surface of anode.
(5) After the deposition of lithium metal, the electrode can be packed to serve as anode in a full battery with, for example, the S containing (graphene-sulphur) composite as the cathode.

Figure 3:
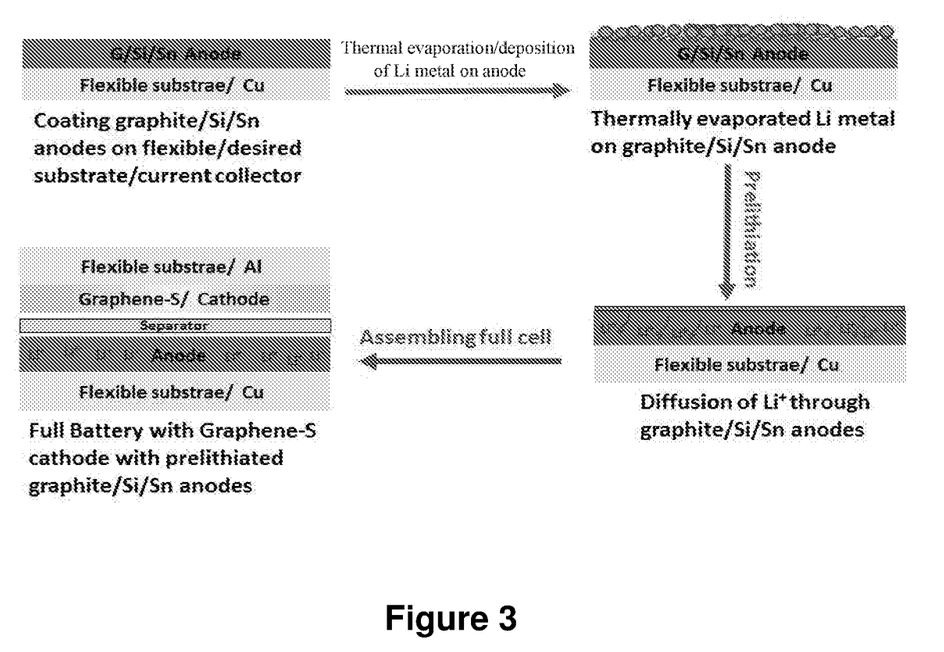
FIG. 3 illustrates embodiment for controlled amount of lithium is deposited on top of the anode (e.g., graphite, Si or Sn) through thermal evaporation. The deposited Li spontaneously intercalates with the anode (called "prelithiation"). An ultrathin layer of lithium could still be present on the surface of anode after prelithiation. The full cell (S as the cathode) was then assembled. The first few charge/discharge cycles can drive the residual Li metal to electrodes. Thus the full battery ends up with no free Li metal in the structure.

FIG. 3 is the representative scheme showing an embodiment of the described and claimed inventions.

In sum, preferred embodiments provide for the thermal deposition of Li-metal onto and/or into the surface of several anodes, e.g. graphite, Si, Sn-based composite materials by in-situ thermal evaporation in vacuum at a certain temperature.

The thickness and the quantity of thermally evaporated Li metal can be easily controlled from, for example, 0.1 mg to 1.5 mg, or 0.1 mg to 50 mg, on adopted graphite anodes by changing the evaporation time. The amount can be limited based on the electrochemical reaction stoichiometry, as described herein for the Li—S system. Thus designed pre-lithiated electrodes serve as a better anode for full Li—S batteries containing, for example, graphene-sulphur composite materials as cathode. Moreover prelithiated anodes obtained by thermal evaporation of Li metal, obtained by present methods, can be much more stable, environmentally safer, and easier in handling and processing.

WORKING EXAMPLES

Additional embodiments are provided in the following non-limiting working examples.

Example 1 (Comparative)

Preparation of Graphitic Anode

Commercial available graphite was well-mixed with the active carbon "Super P" with certain amount of binder to form slurry. The slurry was coated onto the current collector and heated at constant temperature 80-110° C. to dry. The thickness of the coated active material (graphite) was controlled by the amount of the slurry coated.

After drying/baking, the electrode was assembled into 2032 coin cell choosing lithium metal as counter electrode (half-cell assembly) for the electrochemical test. The coin cells (2032) were assembled in an argon-filled glove box, using Celgard 2325 as the separator, and 1 M LiPF$_6$ dissolved in ethyl methyl carbonate (EMC), dimethyl carbonate (DMC) and vinylene carbonate (VC) with a volume ratio of 1:1:1 as the electrolyte. Cells were tested at ambient environment. Tested voltage window was between 100 mV and 1.5 V with a constant current (data not shown).

Preparation of Sulphur Containing Cathode
(Graphene-Sulphur) Cathode

Commercially available bulk S was wet-grinded into micro/nano size. The micro/nano S particles were well-mixed with graphene and a certain amount of binder was added to form a slurry. The slurry was sprayed onto the current collector and heated to dry at constant 60-80° C. The thickness of the active material was controlled by the sprayed amount of the slurry. After drying/baking, the S containing electrode was assembled into 2032 coin cell with lithium metal as counter electrode (half cell assembly) for the electrochemical performance test, and tested at the voltage window between 1.5 V and 3.0 V with a constant current. The data are presented in FIG. 4. The specific capacity of the sprayed sulfur containing cathode was about 1,640 mAh/g (normalized by the actual weight of S in the cathode) and its energy density was around 3,000 Wh/kg.

CR 2032 coin-type half-cells were assembled in an Ar-filled glove box. 1.0 M lithium bis(trifluoromethanesulfonyl)imide in 1,3-dioxolane (DOL) and 1,2-dimethoxyethane (DME) (1:1=v/v) containing 1 wt % LiNO$_3$ was used as the electrolyte. The cells were assembled by sandwiching separators (polypropylene, Celgard 2325) with the working electrodes and lithium metal (reference/counter electrode).

Examples 2, 3, and 4

The Thermal Evaporation of Li Metal on Graphite

Commercially available graphite was well-mixed with the active carbon "Super P" and a certain amount of binder to form slurry. The slurry was coated onto the current collector and heated at constant temperature 80-110° C. to dry. The thickness of the coated active material (graphite) was controlled.

After drying, the electrode was taken to the vacuum chamber to deposit Li metal on top of the graphitic anode by controlled thermal evaporation of Li metal with different amount (e.g. 0.5 mg Li for 5 mg of graphitic anode; similarly, 5 mg Li for 50 mg graphite anode) at a certain temperature and left for prelithiation.

During prelithiation, the Li was diffused through electrode.

The prelithiated electrode was assembled into 2032 coin cell to serve as anode with the sulphur containing cathode as discussed. For the electrochemical performance, the cell was tested at the voltage window between 100 mV-3.0 V and 1.0 V-3.0 V, with a constant current, and the data are presented in FIGS. 5, 6 and FIG. 7. To understand the effect of the Li evaporation amount to the performance of the S-cathode based Li ion battery, the actual S content for each battery was fixed at 1 mg. The graphite content in the anode was fixed at 5 mg.

Figure 5:
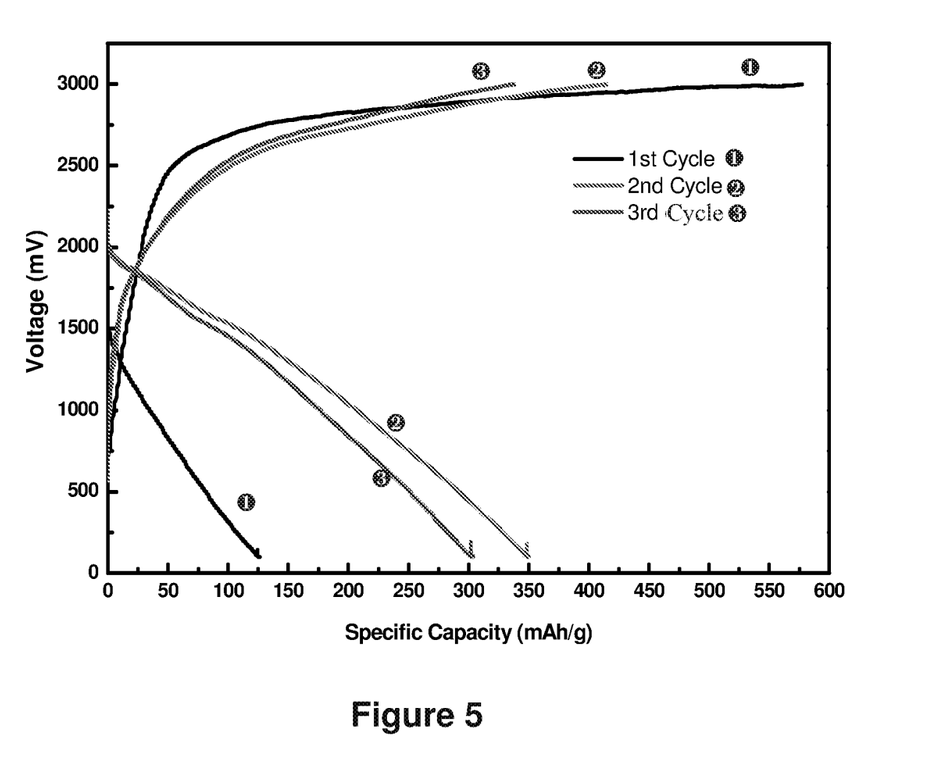
FIG. 5 shows charge/discharge response of the full battery (full-cell) packed with graphene-sulfur (graphene:S=20:80) composite as cathode and pre-lithiated commercial graphite as anode (Li=0.25 mg; graphite=5 mg). The maximum capacity reached nearly 350 mAh/g.

The charge-discharge profile shown in FIG. 5 (Example 2) is the situation when Li metal:graphite is at a lower ratio (Li=0.25 mg and graphite=5 mg). The specific capacity of the full battery normalized to actual S weight is estimated as 350 mAh/g.

Figure 6:
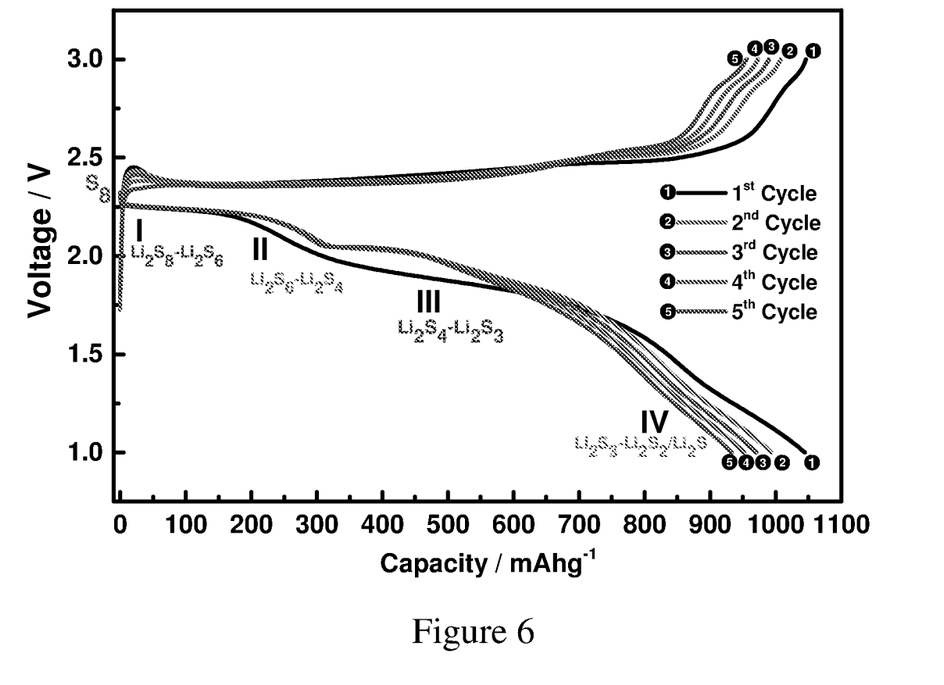
FIG. 6 shows charge/discharge response of the full battery (full-cell) packed with graphene-sulfur (graphene:S=20:80) composite as cathode and pre-lithiated commercial graphite as anode (Li=0.5 mg; graphite=5 mg). The maximum capacity reached nearly 1,100 mAh/g.

FIG. 6 shows the case of Example 3 when Li metal:graphite is 0.5:5 (Li=0.5 mg and C=5 mg) and the specific capacity of the full battery normalized to actual S weight is around 1,100 mAh/g.

Figure 7:
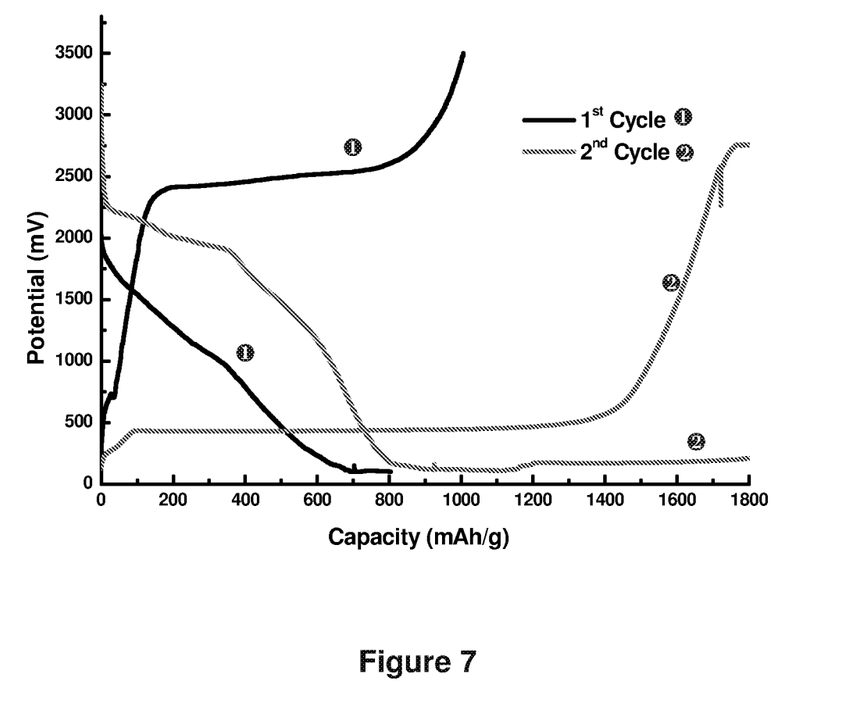
FIG. 7 shows charge/discharge response of the full battery (full-cell) packed with graphene-sulfur (graphene:S=20:80) composite as cathode and pre-lithiated commercial graphite as anode (Li=0.75 mg; graphite=5 mg). The maximum capacity reached nearly 800 mAh/g.

However, in Example 4, when Li metal:graphite is (Li=0.75 mg and C=5 mg) the specific capacity of the full battery normalized to actual S weight is around 800 mAh/g as shown in FIG. 7.

Since the $1^{st}$ cycle of full battery charge/discharge curves for each battery actually involve the prelithiation behavior and thus they should be considered as the activation cycle for the battery. We should look at the $2^{nd}$ cycles for evaluating the battery performance.

In the case of Example 2 with Li:graphite is 0.25:5, the lithium is not sufficient and thus the capacity is limited by the lithium, which is not the case we intend to have.

In Example 3, when the Li:graphite ratio increases to 0.5:5, the $2^{nd}$ cycle capacity drastically increases to 1000 mAh/g, meaning that the deposited Li amount is close to the desired case. The discharge voltage was between 1.0 V and 3.0 V as expected for the S-Graphite full battery. This also indicates the deposited Li is still not in excess to form metallic Li on anode surface.

Figure 8:
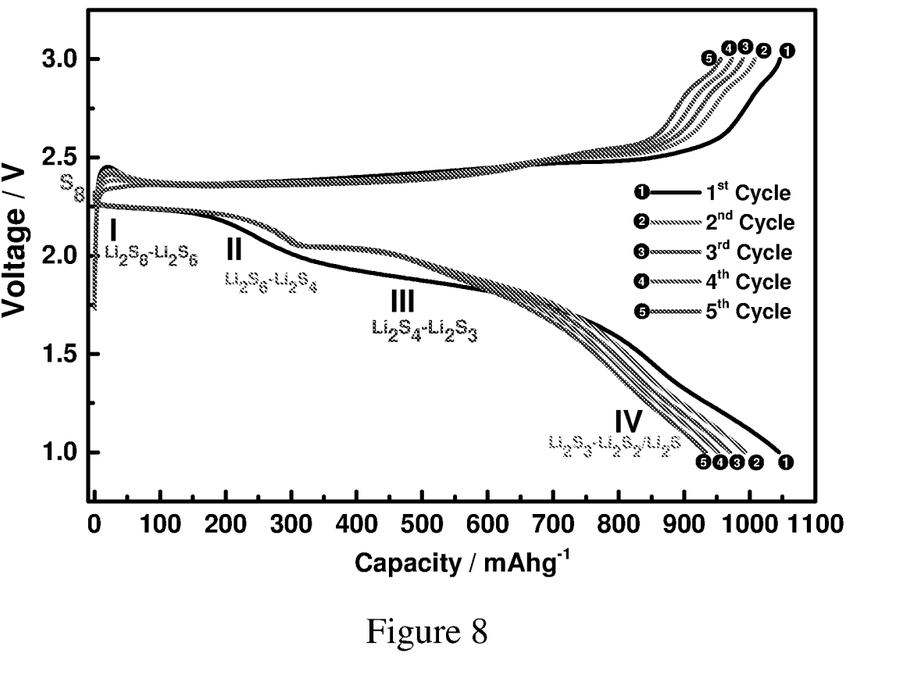
FIG. 8 shows discharge-charge profile of the full battery packed with graphene-sulphur (graphene:S=20:80) composite as cathode and pre-lithiated commercial graphite as anode (Li=0.5 mg; graphite=5 mg), illustrating the region (I) conversion of solid S to soluble polysulfide; region (II) conversion of polysulfides to $Li_2S_6$—$Li_2S_4$; region (III) conversion of polysulfides to solid $Li_2S_3$ and region (IV) conversion of polysulfides to solid $Li_2S_2/Li_2S$.

FIG. 8 explains the details of the discharge-charge profile for the full battery assembled with the anode Li:graphite ratio=0.5:5. The regime (I) is the conversion of solid S to soluble polysulfide and the regime (II) represents the conversion of polysulfides to $Li_2S_6$—$Li_2S_4$. Regime (III) is the conversion of polysulfides to solid $Li_2S_3$ and region (IV) the conversion of polysulfides to solid $Li_2S_2/Li_2S$.

Figure 4:
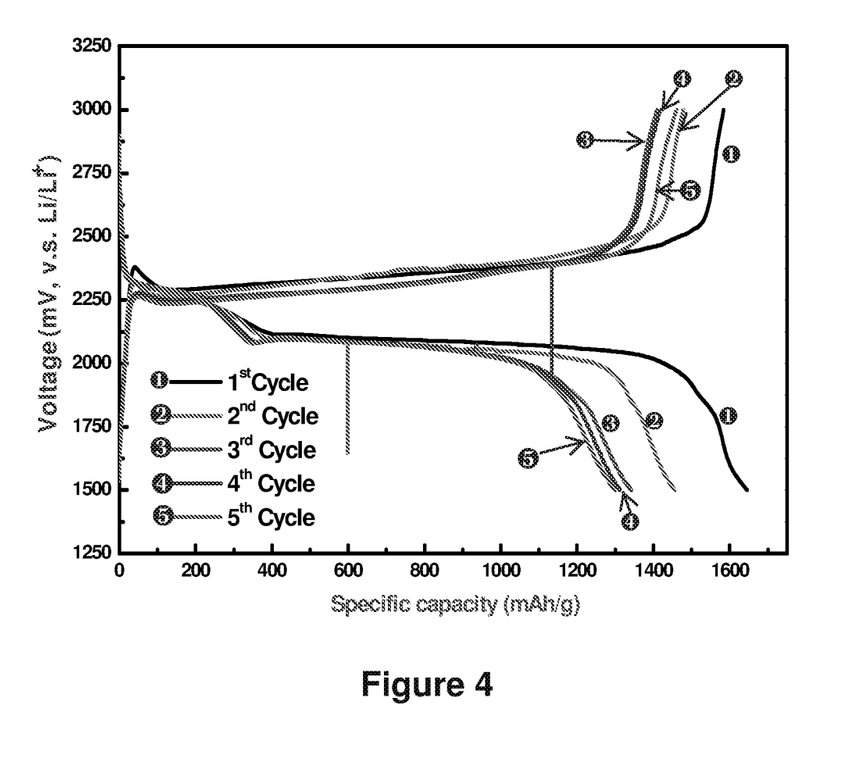
FIG. 4 shows charge/discharge response of the battery (half-cell) composed with graphene-sulphur (graphene:S=20:80) composite as cathode and Li-metal as anode. The maximum capacity achieved in this case was nearly 1,640 mAh/g.

However, in Example 4, when the Li:graphite ratio increases to Li:C=0.75:5, the $2^{nd}$ cycle discharges from 2.25 V to 1.5 V, which is similar to the S—Li battery in FIG. 4. This indicates the presence of metallic Li on anode. The excess metallic Li on anode surface is not preferred for safety and fabrication cost point of view. Hence the control of Li deposition amount is critical. The proposed method of forming Li metal free battery is advantageous.

What is claimed is:

1. A method for preparing an anode for a lithium battery, the method comprising:
   providing at least one anode precursor comprising at least one electrochemically active anode material but which is free of lithium; the anode precursor comprising at least one planar surface; and
   depositing lithium through vapor deposition on the planar surface of the anode precursor, wherein an amount of the lithium deposited through the vapor deposition on the anode matches an amount of sulfur in a cathode of the lithium battery so that formation of lithium dendrites in the anode is suppressed after an activation cycle,
   wherein at least some of the deposited lithium and the electrochemically active anode material at the surface form a second zone on top of a first zone, wherein the second zone comprises a mixture of the lithium and electrochemically active anode material, and the first zone comprises the electrochemically active anode material but does not contain lithium, and
   wherein the second zone has a surface layer including lithium, the surface layer is a terminating layer of the anode, and the surface layer is an electrolyte facing surface.

2. The method of claim 1, further comprising:
   placing an electrolyte on the second zone; and
   placing the cathode including sulfur on the electrolyte to form the lithium battery.

3. The method of claim 1, wherein the total amount of the lithium deposited in the second zone is controlled to be within a range of ratios between the "weight of electrochemically active anode material" to the "weight of lithium" of 19:1 to 8:1.

4. The method of claim 1, wherein at least 50% of the lithium is in the second zone.

5. The method of claim 1, wherein the electrochemically active anode material is graphite, Si, or Sn.

6. The method of claim 5, wherein the total amount of the lithium deposited in the second zone is controlled to be within a range of ratios between the "weight of electrochemically active anode material" to the "weight of lithium" of 19:1 to 8:1.

7. The method of claim 1, further comprising:
applying the activation cycle to the battery to consume the lithium so that no lithium metal remains in the anode, to suppress the formation of the lithium dendrites.

8. A method for preparing an anode for a lithium battery comprising:
providing at least one anode precursor comprising at least one electrochemically active anode material but which is free of lithium; the anode precursor comprising at least one planar surface; and
depositing lithium through vapor deposition on the planar surface of the anode precursor, wherein an amount of the lithium deposited through the vapor deposition on the anode matches an amount of sulfur in a cathode of the lithium battery so that formation of lithium dendrites in the anode is suppressed after an activation cycle,
wherein at least some of the deposited lithium and the electrochemically active anode material at the surface form a second zone on top of a first zone, wherein the second zone comprises a mixture of the lithium and electrochemically active anode material, and the first zone comprises the electrochemically active anode material but does not contain lithium,
at least some of the deposited lithium forms a third zone which is a surface layer of lithium which is free of the electrochemically active anode material and disposed on the second zone, and
wherein the third zone has a thickness of 500 nm or less, the surface layer of lithium is a terminating layer of the anode, and the surface layer of lithium is an electrolyte facing surface.

9. The method of claim 8, further comprising:
placing an electrolyte on the third zone; and
placing the cathode including sulfur on the electrolyte to form the lithium battery.

10. The method of claim 8, wherein the total amount of the lithium deposited in the second zone and the third zone is controlled to be within a range of ratios between the "weight of electrochemically active anode material" to the "weight of lithium" of 19:1 to 8:1.

11. The method of claim 8, wherein at least 50% of the lithium is in the second zone.

12. The method of claim 8, wherein the electrochemically active anode material is graphite, Si, or Sn.

13. The method of claim 12, wherein the total amount of the lithium deposited in the second zone and the third zone is controlled to be within a range of ratios between the "weight of electrochemically active anode material" to the "weight of lithium" of 19:1 to 8:1.

14. The method of claim 9, further comprising:
applying the activation cycle to the battery to consume the lithium so that no lithium metal remains in the anode, to suppress the formation of the lithium dendrites.

* * * * *